(12) United States Patent
Ducher et al.

(10) Patent No.: US 11,673,450 B2
(45) Date of Patent: Jun. 13, 2023

(54) METHODS AND SYSTEMS FOR COOLING

(71) Applicant: Carrier Corporation, Palm Beach Gardens, FL (US)

(72) Inventors: Gael Ducher, Le Mesnil-Esnard (FR); Nigel Gerald Charlesworth, Nantwich (GB)

(73) Assignee: CARRIER CORPORATION, Palm Beach Gardens, FL (US)

( * ) Notice: Subject to any disclaimer, the term of this patent is extended or adjusted under 35 U.S.C. 154(b) by 224 days.

(21) Appl. No.: 17/109,787

(22) Filed: Dec. 2, 2020

(65) Prior Publication Data
US 2021/0162834 A1 Jun. 3, 2021

(30) Foreign Application Priority Data
Dec. 3, 2019 (EP) .................................... 19306563

(51) Int. Cl.
*B60H 1/00* (2006.01)
*B60P 3/20* (2006.01)
(Continued)

(52) U.S. Cl.
CPC ............... *B60H 1/005* (2013.01); *B60P 3/20* (2013.01); *F02B 63/06* (2013.01); *F04B 17/05* (2013.01);
(Continued)

(58) Field of Classification Search
CPC .. B60H 1/005; B60H 1/00428; B60H 1/3232; B60H 1/3201; B60P 3/20; F02B 63/06;
(Continued)

(56) References Cited

U.S. PATENT DOCUMENTS

| 7,485,979 B1* | 2/2009 | Staalesen | .............. F16H 61/431 307/68 |
| 2003/0005715 A1* | 1/2003 | Kooi | ........................ B60P 3/20 62/323.3 |

(Continued)

FOREIGN PATENT DOCUMENTS

| EP | 1832451 A1 | 9/2007 |
| JP | S59164220 A | 9/1984 |

(Continued)

OTHER PUBLICATIONS

European Search Report for Application No. 19306563.8; dated Jun. 4, 2020; 9 Pages.
(Continued)

*Primary Examiner* — Sizo B Vilakazi
(74) *Attorney, Agent, or Firm* — Cantor Colburn LLP

(57) ABSTRACT

A system for cooling a storage area of a vehicle includes one or more eutectic plates (102) for cooling the storage area (101); a refrigeration system (103) configured to cool the one or more eutectic plates (102); an electrical system (106) configured to receive electrical power from a mains power supply and supply electrical power to the refrigeration system (103); a variable displacement hydraulic pump (113) having an input shaft for being driven by an engine (112) of the vehicle (100); and a generator (107) configured to receive hydraulic fluid from the hydraulic pump (113), generate electrical power in response thereto and supply the electrical power to the refrigeration system (103); the hydraulic pump (113) is configured to reduce the volume of hydraulic fluid that it supplies to the generator (107) for each rotation of the input shaft, as the rotational speed of the input shaft increases.

15 Claims, 3 Drawing Sheets

(51) Int. Cl.
  *F02B 63/06* (2006.01)
  *F04B 17/05* (2006.01)
  *F04B 49/12* (2006.01)
  *F04B 53/14* (2006.01)
  *H02K 7/18* (2006.01)

(52) U.S. Cl.
  CPC .............. *F04B 49/12* (2013.01); *F04B 53/14* (2013.01); *H02K 7/1815* (2013.01)

(58) Field of Classification Search
  CPC .......... F04B 17/05; F04B 49/12; F04B 53/14; H02K 7/1815; Y02T 10/88; F25D 11/006
  See application file for complete search history.

(56) References Cited

U.S. PATENT DOCUMENTS

| | | |
|---|---|---|
| 2007/0209378 A1 | 9/2007 | Larson |
| 2008/0011007 A1 | 1/2008 | Larson et al. |
| 2009/0134848 A1* | 5/2009 | Boisvert ............. F16H 61/4035 91/499 |
| 2009/0196767 A1* | 8/2009 | Peters ................... F04B 49/002 417/364 |
| 2011/0067852 A1* | 3/2011 | Farrar ..................... B65D 88/74 165/59 |
| 2016/0365772 A1* | 12/2016 | Landrum ................ F02B 63/06 |
| 2018/0001739 A1* | 1/2018 | Vehr ....................... F25B 49/02 |
| 2019/0061473 A1* | 2/2019 | Dykes ................. B60H 1/3208 |

FOREIGN PATENT DOCUMENTS

| | | |
|---|---|---|
| JP | S61271118 A | 12/1986 |
| WO | 2009141668 A1 | 11/2009 |
| WO | 2014205095 A1 | 12/2014 |

OTHER PUBLICATIONS

European Search Report for Application No. 19306563.8; dated Feb. 7, 2023; 5 Pages.

\* cited by examiner

METHODS AND SYSTEMS FOR COOLING

FOREIGN PRIORITY

This application claims priority to European Patent Application No. 19306563.8, filed Dec. 3, 2019, and all the benefits accruing therefrom under 35 U.S.C. § 119, the contents of which in its entirety are herein incorporated by reference.

TECHNICAL FIELD

The present disclosure relates to methods of, and systems for, cooling and in particular to systems and methods that, for example, cool a storage area of a vehicle while the vehicle is transporting chilled or frozen goods.

BACKGROUND

It is common for goods to be required to be maintained at or below a particular temperature during transport and delivery. While transporting goods on a vehicle, maintaining the goods at or below a particular temperature (or in a particular temperature range) may involve using a refrigeration system powered by a power source on the vehicle to cool the goods. However, such a refrigeration system places a power demand on the vehicle. Furthermore, if the refrigeration system or the power source fails, the temperature of the goods may increase to above a permitted temperature before it is possible to resolve the failure or provide an alternative cooling system.

Alternatively, goods being transported on a vehicle may be cooled using pre-cooled material on the vehicle that provides a "cold reservoir" capable of maintaining the goods at or below a particular temperature for a particular amount of time. Phase change materials can be effective at providing a "cold reservoir" as they may absorb latent heat at a phase transition whilst maintaining a substantially constant temperature until the phase transition is completed. Eutectic plates are an example of receptacles containing a phase change material that can be used for the purpose of cooling goods during transport.

When used for this purpose, eutectic plates are typically cooled on a vehicle for transporting goods by a refrigeration system powered by a mains power supply (an electrical grid external to the vehicle—e.g. a national/domestic electrical grid) while the vehicle is stationary. After the eutectic plates are cooled so that the eutectic mixture contained within the eutectic plates is in a solid phase, the refrigeration system stops cooling the eutectic plates and the vehicle can then be driven away. The eutectic plates maintain goods being transported on the vehicle below a particular temperature (e.g. below the temperature of a phase transition of the eutectic mixture) for a particular amount of time (e.g. until the eutectic mixture has absorbed enough heat to transition from a solid phase to a liquid phase). The process may then be repeated by again cooling the eutectic plates while the vehicle is stationary using power supplied from a mains power supply.

Using eutectic plates to cool goods being transported on a vehicle can be desirable, as the eutectic plates do not require a power source to cool the goods while the vehicle is mobile. However, the vehicle will have a limited time to transport the goods before the eutectic plates can no longer maintain the goods at or below a required temperature. This reduces the time (and hence distance) over which the vehicle may transport the goods whilst maintaining the goods at the desired, cooled temperature. Furthermore, if access is required to the storage area of the vehicle containing the goods before all of the goods have finished being transported, for example to deliver some but not all of the goods, this may result in a rise in temperature in the storage area and additional heat being supplied to the eutectic plates. Thus, there may also be a limited number of "delivery stops" before the eutectic plates are then unable to maintain the goods at or below the required temperature.

Providing additional eutectic plates on a vehicle may increase the time over which goods being transported on the vehicle can be maintained at or below a particular temperature (and/or the number of "delivery stops" that can be made). However, this will add weight to the vehicle (e.g. a eutectic plate may weigh around 100 kg), may decrease the storage capacity of the vehicle and will increase the time and/or power required to cool the eutectic plates while the vehicle is stationary, prior to the vehicle transporting the goods.

SUMMARY

A first aspect of the present disclosure provides a system for cooling a storage area of a vehicle, comprising: one or more eutectic plates for cooling the storage area; a refrigeration system configured to cool the one or more eutectic plates; an electrical system configured to receive electrical power from a mains power supply and supply electrical power to the refrigeration system; a variable displacement hydraulic pump having an input shaft for being driven by an engine of the vehicle; and a generator configured to receive hydraulic fluid from the hydraulic pump, generate electrical power in response thereto and supply the electrical power to the refrigeration system; wherein the hydraulic pump is configured to reduce the volume of hydraulic fluid that it supplies to the generator for each rotation of the input shaft, as the rotational speed of the input shaft increases.

Similarly, the hydraulic pump is configured to increase the volume of hydraulic fluid that it supplies to the generator for each rotation of the input shaft, as the rotational speed of the input shaft decreases.

The Applicant has recognised that providing a refrigeration system for cooling the one or more eutectic plates that is capable of being selectively powered by a generator on the vehicle (e.g. using power provided from an engine of the vehicle) can increase the period over which the one or more eutectic plates can maintain a temperature in the storage area of the vehicle at or below a particular temperature (when it is not possible to cool the eutectic plates using a power source external to the vehicle, such as a mains power supply).

Conventionally, vehicle storage areas have either been passively cooled by pre-cooled eutectic plates (that have been cooled by being connected to the mains power supply), or have been actively cooled by a refrigeration system that is activated when the temperature in the storage area rises above a certain set-point. These techniques have been seen as alternatives to each other. For example, eutectic plates may be chosen if the use of the vehicle is such that the storage area only needs to be maintained cool for a relatively short period of time whilst the vehicle is mobile, whereas an active refrigeration system may be chosen when the storage area is required to be maintained cool for a relatively long period of time. As these systems have conventionally been seen as alternatives, it has therefore not been considered before to cool eutectic plates whilst the vehicle is moving, by using a variable displacement hydraulic pump and generator on the vehicle as described herein.

The use of a hydraulic pump that can reduce the volume of hydraulic fluid that it supplies to the generator for each rotation of the input shaft, as the rotational speed of the input shaft increases, may maintain a suitable amount of hydraulic fluid being supplied to the generator regardless of the rotational speed of the input shaft. This enables a suitable amount of power to be generated by the generator (for being supplied to the refrigeration system) regardless of the rotational speed of the input shaft. This can therefore allow a suitable amount of power to be supplied from the generator to the refrigeration system regardless of the RPM of the vehicle engine ("engine speed") that is used to rotate the input shaft. This can avoid the need for additional electrical circuitry/components that may otherwise be required to regulate a supply of electrical power between the generator and refrigeration system. The system may thereby maintain the power supplied from the generator to the refrigeration system within a particular range regardless of the rotational speed of the input shaft.

The hydraulic pump may be configured to vary the volume of hydraulic fluid that it supplies to the generator for each rotation of the input shaft with an inversely proportional relationship to the rotational speed of the input shaft.

The generator may be configured to supply the refrigeration system with a substantially constant power supply, regardless of the RPM of the vehicle engine.

The generator may be configured to supply electrical power to the refrigeration system at substantially the same voltage and/or frequency as that which is supplied to the refrigeration system when said electrical system is connected to the mains power supply.

The system may be configured such that the power supplied from the generator is substantially the same as the mains power, thereby avoiding a total redesign of the electrical supply system of the refrigeration system that cools the eutectic plates. This can allow the refrigeration system to use simpler electronic circuitry and allow existing systems that employ refrigeration systems intended to (only) be powered by a mains power supply to be more easily modified to include a generator configured to supply power to the refrigeration system in accordance with the present disclosure.

Both the generator and the electrical system may be configured to supply three phase electrical power at 400 V and 50 Hz to the refrigeration system.

The hydraulic pump may comprise a piston configured to displace hydraulic fluid in a hydraulic fluid conduit when the input shaft is rotated, and configured to vary an amount of displacement of hydraulic fluid in the hydraulic fluid conduit per revolution of the input shaft by varying an amount of displacement of the piston per revolution of the input shaft. Said hydraulic fluid conduit may fluidly connect the hydraulic pump to the generator.

The refrigeration system may be configured to cool the one or more eutectic plates by circulating a refrigerant through a conduit in the one or more eutectic plates and/or a conduit in contact with an outside surface of the one or more eutectic plates.

The system may comprise one or more temperature sensors for sensing a temperature of the one or more eutectic plates and/or a temperature of a storage area of a vehicle.

The system may provide an indication of a temperature sensed by the one or more temperature sensors to a user (e.g. so that the user can control the system based on the temperature sensed by the one or more temperature sensors).

The system may comprise a controller configured to control whether electrical power is supplied from the generator to the refrigeration system so as to cool the eutectic plates based on a comparison of a temperature sensed by the one or more temperature sensors with one or more temperature set-points. A user may set the one or more temperature set-points using a user-input device. The controller may comprise a memory and may comprise a processor and/or processing circuit/circuitry.

A temperature set-point may be determined based on one or more other temperature set-points. For example, one or more temperature set-points may be determined corresponding to an (e.g. predetermined and/or programmable) offset from one or more other temperature set-points (such as "target" temperature set-point).

When a temperature sensed by the one or more temperature sensors is at or above a first temperature set-point, the controller may be configured to control the system to supply electrical power from the generator to the refrigeration system so as to cool the eutectic plates. When a temperature sensed by the one or more temperature sensors is at or below a second temperature set-point, the controller may be configured to control the system to stop supplying electrical power from the generator to the refrigeration system so as to stop cooling the eutectic plates.

The controller may be configured to control whether the generator receives hydraulic fluid from the hydraulic pump based on the comparison of a temperature sensed by the one or more temperature sensors with the one or more temperature set-points.

The controller may be configured to activate the generator (by supplying hydraulic fluid to it from the pump) and/or to deactivate the generator (by not supplying hydraulic fluid to it from the pump) based on a determination of whether or not the refrigeration system is required to cool the one or more eutectic plates (e.g. based on the one or more temperature set-points).

The system may be configured such that when the generator is not generating electrical power, the input shaft is allowed to rotate without causing displacement of hydraulic fluid in the hydraulic pump. This may reduce the power supplied from an engine to the system to a suitable minimal amount (when desired).

From another aspect, the present disclosure provides a vehicle comprising the system for cooling described herein, said vehicle also comprising: said storage area; and an engine for moving said vehicle; wherein the engine is mechanically coupled to said input shaft of the hydraulic pump.

The vehicle may be a road vehicle, marine vehicle or airbourne vehicle. For instance, the vehicle may be a truck, lorry or van (e.g. a box van/box truck).

From another aspect, the present disclosure provides a method of cooling the storage area of said vehicle described herein, the method comprising: (i) when the vehicle is stationary: connecting a mains power supply to the electrical system, and supplying electrical power from the mains power supply to the refrigeration system so as to cool the one or more eutectic plates; and (ii) when the vehicle is mobile: using the engine of the vehicle to rotate the input shaft; supplying hydraulic fluid from the hydraulic pump to the generator, the generator generating electrical power in response thereto and supplying the electrical power to the refrigeration system so as to cool the one or more eutectic plates; wherein the hydraulic pump reduces the volume of hydraulic fluid that it supplies to the generator for each rotation of the input shaft, as the rotational speed of the input shaft increases.

The method may comprise reducing the volume of hydraulic fluid that the hydraulic pump supplies to the generator in response to the rotational speed of the input shaft increasing.

From another aspect, the present disclosure provides a method of providing said vehicle described herein by installing the system for cooling described herein in the vehicle, the method comprising: providing said storage area with the one or more eutectic plates; providing the vehicle with the generator, the hydraulic pump, the refrigeration system and the electrical system; mechanically coupling said engine to the input shaft; fluidly coupling the hydraulic pump to the generator; and electrically coupling the generator to the refrigeration system.

Although the cooling elements have been described herein as eutectic plates, it is contemplated that the plates may be substantially planar or any other geometric shape. It is also contemplated that cooling blocks that do not comprise a eutectic material may be provided instead of eutectic plates.

Accordingly, the present disclosure also provides a system for cooling a storage area of a vehicle, comprising: one or more cooling blocks for cooling the storage area; a refrigeration system configured to cool the one or more cooling blocks; an electrical system configured to receive electrical power from a mains power supply and supply electrical power to the refrigeration system; a variable displacement hydraulic pump having an input shaft for being driven by an engine of the vehicle; and a generator configured to receive hydraulic fluid from the hydraulic pump, generate electrical power in response thereto and supply the electrical power to the refrigeration system; wherein the hydraulic pump is configured to reduce the volume of hydraulic fluid that it supplies to the generator for each rotation of the input shaft, as the rotational speed of the input shaft increases.

Each of the one or more cooling blocks may comprise a phase change material suitable for cooling the storage area of the vehicle by absorbing heat when undergoing a phase transition.

The one or more cooling blocks may be provided in place of the one or more eutectic plates in the aspects and embodiments described herein.

For instance, the refrigeration system may be configured to cool the one or more cooling blocks by circulating a refrigerant through a conduit in the one or more cooling blocks and/or a conduit in contact with an outside surface of the one or more cooling blocks.

BRIEF DESCRIPTION OF THE DRAWINGS

Various embodiments will now be described, by way of example only, and with reference to the accompanying drawings in which:

FIG. 3A shows a plot of temperature against time for a conventional system having eutectic plates, whereas

DETAILED DESCRIPTION

The present disclosure relates to methods of, and systems for, cooling that may be used to cool goods located in a storage area of a vehicle.

Figure 1:
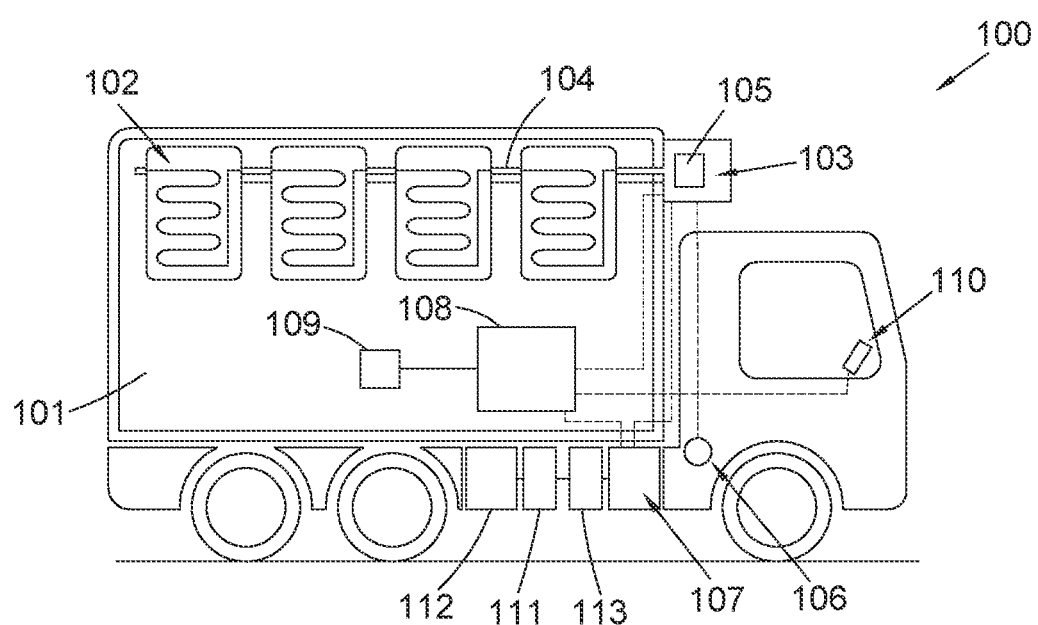
FIG. 1 shows a vehicle having a system in accordance with an embodiment of the present disclosure.

FIG. 1 shows an example of a vehicle 100 comprising a system for cooling a storage area 101 of the vehicle 100 in accordance with an embodiment of the present disclosure. Although the illustrated vehicle is a truck, it will be appreciated that any other form of vehicle may be provided with the system disclosed herein, such as a lorry, van, marine vehicle or airbourne vehicle. The system comprises a plurality of eutectic plates 102 and a refrigeration system 103. The refrigeration system 103 is configured to cool the eutectic plates 102 by circulating a refrigerant through one or more conduits (e.g. pipe/pipes) 104 passing through the eutectic plates 102. As the refrigerant passes through the eutectic plates 102, the refrigerant can absorb heat from a eutectic mixture contained within the eutectic plates 102 to cool the eutectic mixture. The refrigeration system 103 may be configured for heat absorbed from the eutectic plates 102 to cause the refrigerant to undergo a phase transition from a liquid phase to a gas or vapour phase. The refrigerant may then pass through a compressor 105 to increase a pressure of the refrigerant (and may further increase a temperature of the refrigerant). The refrigeration system 103 may be configured for the refrigerant to then undergo a reverse phase transition from a gas or vapour phase to a liquid phase while passing heat to an exterior of the vehicle 100. The pressure of the refrigerant may then be reduced (e.g. using one or more expansion valves) so that the temperature of the refrigerant is reduced before the refrigerant is recirculated back through the eutectic plates 102.

An electrical system 106 is configured to receive electrical power from a mains power supply (an electrical grid external to the vehicle 100) and supply electrical power to the refrigeration system 103. The electrical system 106 is suitable for powering the refrigeration system 103 when the vehicle 100 is stationary. The refrigeration system 103 uses the power supplied by the electrical system 106 to power the compressor 105 and so as to circulate the refrigerant to cool the eutectic mixture. The refrigeration system 103 can thereby cause the eutectic mixture to transition from a liquid phase to a solid phase. Once the eutectic plates 102 have been cooled, the electrical system 106 is disconnected from the mains power supply and the vehicle is driven away.

For example, while the vehicle 100 is stationary (e.g. prior to transporting goods), the refrigeration system 103 can cool the eutectic plates 102 so that the eutectic mixture is in a solid phase (and the vehicle 100 may be loaded with goods to be transported) prior to the vehicle then becoming mobile (e.g. to transport the goods).

Once the eutectic plates 102 have been cooled, they cool the storage area 101 of the vehicle 100 and maintain it cool for a period of time while the vehicle 100 may be mobile (e.g. while the vehicle is transporting goods), without requiring electrical power to be supplied to the refrigeration system 103. The eutectic plates 102 cool the storage area 101 of the vehicle 100 by the eutectic mixture absorbing heat from the storage area 101 of the vehicle 100. When the eutectic mixture is in a solid phase and approaching the temperature at which the eutectic mixture will transition from the solid phase to a liquid phase (a eutectic point), the eutectic mixture will continue to absorb heat while maintaining a substantially constant temperature until the transition from the solid phase to the liquid phase is completed. Therefore, the eutectic plates 102 can be particularly effective at cooling the storage area 101 of the vehicle when the eutectic mixture is in a solid phase and has a temperature close to a eutectic point (phase transition). Hence, a eutectic mixture may be selected for the eutectic plates 102 based on a temperature of a eutectic point of the eutectic mixture and a temperature at which it is desired to maintain the storage area 101 of the vehicle 100 at or below. For example, a eutectic mixture may be selected that has a eutectic point between a temperature that the refrigeration system 103 is suitable for cooling the eutectic mixture to and a temperature that the storage area 101 of the vehicle 100 is desired to be maintained at or below. Accordingly, the refrigeration system 103 can be configured for cooling the eutectic plates 102 below a eutectic point of the eutectic mixture by, for example, selecting a suitable refrigerant (e.g. selecting a refrigerant that, when in the one or more conduits 104 passing through the eutectic plates 102, will undergo a phase transition at a lower temperature than a eutectic point of the eutectic mixture).

Still referring to FIG. 1, the system for cooling the storage area 101 of the vehicle 100 also comprises a (hydraulically driven) generator 107 configured to generate and supply electrical power to the refrigeration system 103. The generator 107 is configured to be able to supply electrical power to the refrigeration system 103 (when desired) while the vehicle is mobile. The generator 107 may be used to selectively power the refrigeration system 103 to cool the eutectic plates 102, e.g. automatically when the temperature of the storage area 101 (or a plate 102) rises above a certain set-point or manually by a user intervention. The generator 107 may be used to selectively power the refrigeration system 103 so as to maintain the eutectic mixture in a solid phase. This use of the generator 107 can extend the period over which the eutectic plates 102 are capable of maintaining the storage area 101 of the vehicle 100 at or below a particular desired temperature. However, as set out below, the generator 107 may only be required to supply power to the refrigeration system 103 for some but not all of the time that the vehicle 100 is in motion.

Continuing with reference to FIG. 1, the system for cooling the storage area 101 of the vehicle 100 may comprise a controller 108, a temperature sensor 109 and optionally a user-input device 110.

The temperature sensor 109 is configured to sense a temperature inside the storage area 101 of the vehicle 100 and may provide an indication of a temperature inside the storage area 101 of the vehicle 100 to the controller 108. The user-input device 110 is configured to allow a user to provide the controller 108 with a first temperature set-point and a second temperature set-point. The controller 108 is configured to determine when a temperature in the storage area 101 of the vehicle 100 is at or above the first temperature set-point using the temperature sensor 109 and, when it is determined that this is the case, control the system to supply electrical power from the generator 107 to the refrigeration system 103. The refrigeration system 103 can use the electrical power supplied from the generator 107 to cool the eutectic plates 102 in the manner discussed above. The controller 108 is also configured to determine when a temperature in the storage area 101 of the vehicle is at or below the second temperature set-point using the temperature sensor 109 and, when it is determined that this is the case, control the system to stop supplying electrical power from the generator 107 to the refrigeration system 103 (e.g. by stopping the generator 107). It will be appreciated that the second temperature set-point should correspond to a lower temperature than the first temperature set-point and that, using the functionality described above, the controller 108 is configured to control the system to regulate a temperature in the storage area 101 of the vehicle 100 based on the first temperature set-point and the second temperature set-point (e.g. to maintain a temperature in the storage area 101 of the vehicle 100 to be between the first temperature set-point and the second temperature set-point).

Still referring to FIG. 1, an engine drive shaft 111, such as a power take off drive shaft, may be provided that is configured to use power provided by an engine 112 of the vehicle 100 to operate a (variable-displacement) hydraulic pump 113, e.g. by the engine drive shaft 111 rotating an input shaft of the hydraulic pump 113. The engine 112 therefore drives the hydraulic pump 113 so as to provide a hydraulic force that drives the generator 107 to generate electrical power (when required). More specifically, rotation of the engine drive shaft 111 causes one or more pistons of the hydraulic pump 113 to move so as to pump hydraulic fluid through the generator 107, which generates electricity from the moving fluid. The hydraulic pump 113 is configured so that the amount of fluid displacement caused by movement (i.e. by each stroke) of the one or more pistons is related to the rate of revolution of the input shaft (and hence to the engine speed). Therefore, when the engine speed (RPM) varies, the displacement (i.e. stroke length) of the one or more pistons of the hydraulic pump 113 also varies. More specifically, the hydraulic pump 113 is configured such that, for at least a certain range of rotational speeds of the input shaft (i.e. engine speeds), the faster the input shaft is rotated, the shorter the stroke length of each of the one or more pistons is such that a smaller volume of fluid is displaced by each stroke. For example, the hydraulic pump 113 may be configured such that the amount of hydraulic fluid (e.g. by volume) displaced by each stroke is inversely proportional to the rotational speed of the input shaft (for at least a certain range of rotational speeds of the input shaft). The hydraulic pump 113 may thus be configured to provide hydraulic fluid to the generator 107 at a substantially constant rate, regardless of the rotational speed of the input shaft (i.e. regardless of the engine RPM). The generator 107 may thereby supply a substantially constant amount of electrical power (e.g. having a substantially constant voltage) to the refrigeration system 103 independent of the rate that the engine 112 rotates the engine drive shaft 111 (e.g. independent of the "engine speed" or RPM at which the engine 112 is operating). Thus, the generator 107 may supply electrical power to the refrigeration system 103 with substantially the same characteristics as the electrical power that can be supplied by the mains via electrical system 106. For example, both the electrical system 106 and the generator 107 may be configured to provide three phase electrical power at 400 V and 50 Hz to the refrigeration system 103 (although other suitable electrical characteristics may be selected, as desired).

Figure 2:
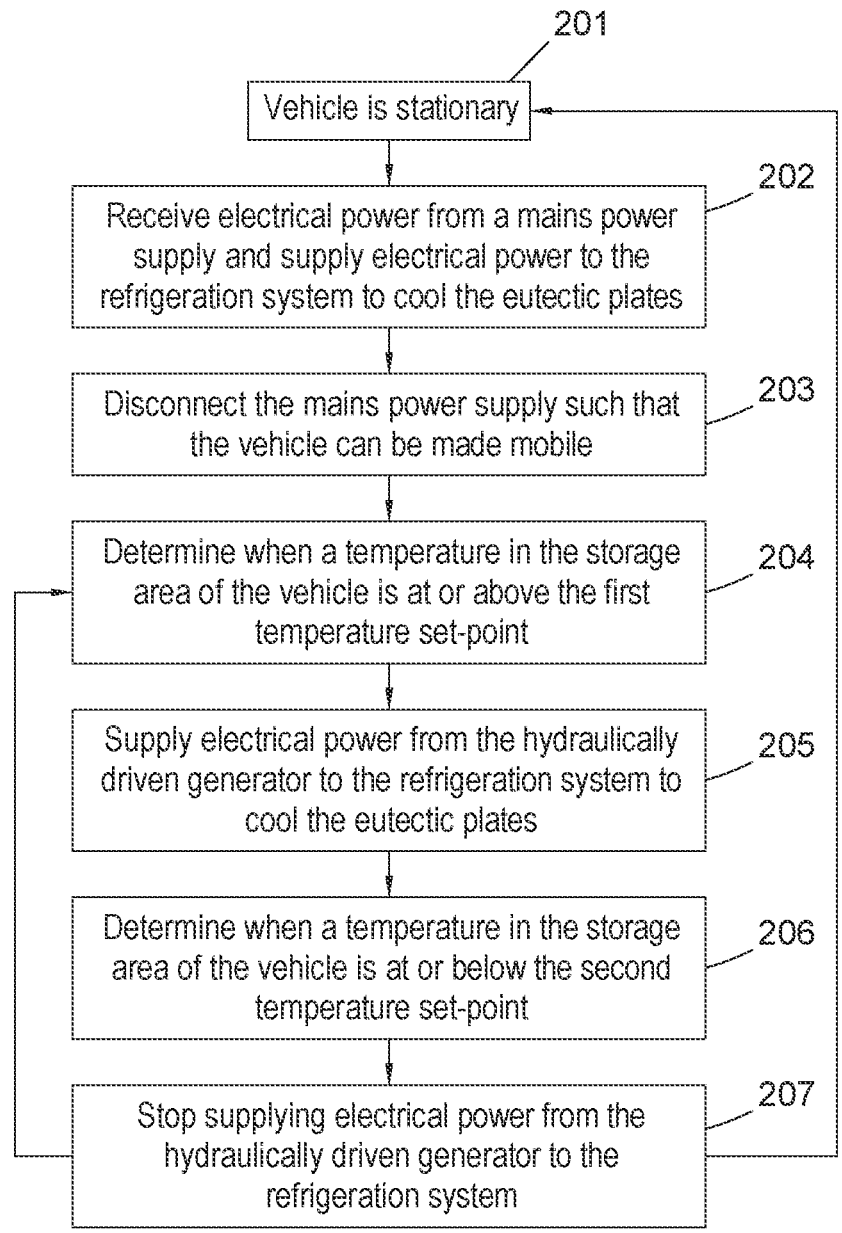
FIG. 2 is a flowchart showing a method of cooling a storage area according to an embodiment of the present disclosure.

FIG. 2 is a flowchart showing a method of cooling the storage area 101 of the vehicle 100 of FIG. 1 according to an embodiment of the present disclosure.

As shown in FIG. 2, when the vehicle 100 is stationary (step 201), the electrical system 106 receives electrical power from a mains power supply and supplies electrical power to the refrigeration system 103 to cool the eutectic plates 102 (step 202). Subsequently, for example after a sufficient amount of cooling of the eutectic plates 102 (e.g. when the eutectic mixture is in a solid phase and/or a temperature in the storage area 101 of the vehicle is at or below the second temperature set-point), the electrical system 106 is disconnected from the mains power supply such that the vehicle 100 can be made mobile (step 203). Subsequently, the controller 108 determines when a temperature in the storage area 101 of the vehicle 100 has risen to be at or above the first temperature set-point using the temperature sensor 109 (step 204). The first temperature set-point may be provided to the controller 108 by the user-input device 110. When it is determined by the controller 108 that a temperature in the storage area 101 of the vehicle 100 is at or above the first temperature set-point, the controller 108 controls the system to supply electrical power from the generator 107 to the refrigeration system 103 to cool the eutectic plates 102 (step 205). To power the hydraulically driven generator 107, as described above, the engine drive shaft 111 is rotated by the engine 112 to rotate the input shaft of the variable-displacement hydraulic pump 113. The rate of rotation of the input shaft may vary (e.g. based on a varying "engine speed") and, when this occurs, the variable-displacement hydraulic pump 113 varies a volume of hydraulic fluid that is supplied to the generator 107 per a rotation of the input shaft (e.g. to provide a substantially constant rate of hydraulic fluid to the generator 107 over time). The controller 108 will determine when a temperature in the storage area 101 of the vehicle 100 is at or below the second temperature set-point using the temperature sensor 109 (step 206). When it is determined by the controller 108 that a temperature in the storage area 101 of the vehicle 100 is at or below the second temperature set-point, the controller 108 controls the refrigeration system 103 and/or the generator 107 to stop supplying electrical power from the generator 107 to the refrigeration system 103 (step 207). Steps 204-207 may be repeated each time that the controller 108 determines that a temperature in the storage area 101 of the vehicle 100 is subsequently at or above the first temperature set-point. When the vehicle 100 is subsequently stationary, step 202 may be repeated so as to cool the eutectic plates 102 using the mains power supply.

Figure 3A:
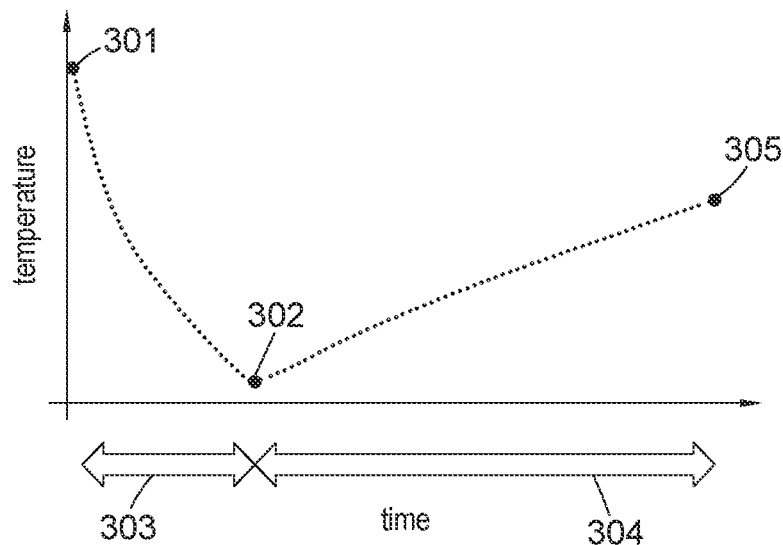
Figure 3B:
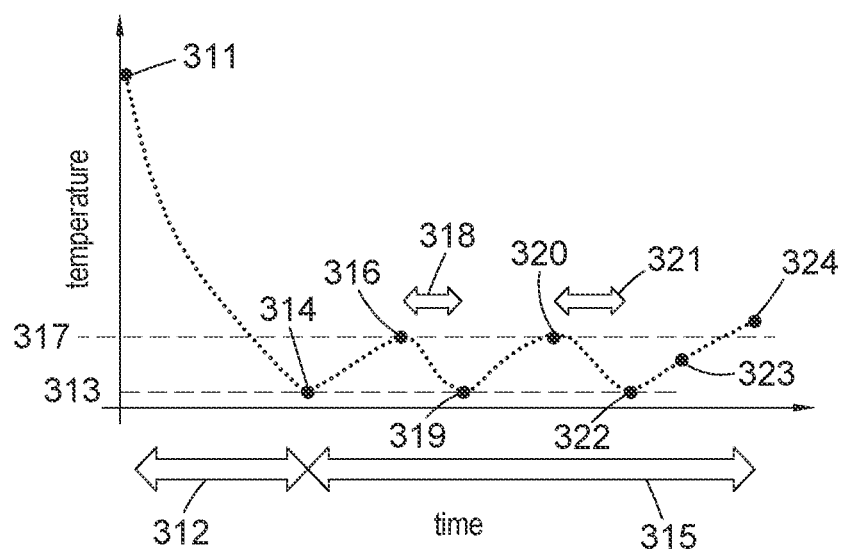
FIG. 3B shows a plot of temperature against time for a system according to an embodiment of the present disclosure.

FIGS. 3A and 3B are examples of plots of temperature against time that illustrate advantages of the embodiments of the present disclosure over conventional systems that use eutectic plates.

FIG. 3A is a comparative example showing a plot of temperature against time in a storage area of a vehicle that is cooled by eutectic plates in a conventional system. In this system, the eutectic plates can only be cooled when connection to a mains power supply is possible, i.e. when the vehicle is stationary. At point 301, electrical power is provided by a mains power supply to a refrigeration system to cool the eutectic plates. While the refrigeration system is cooling the eutectic plates, the temperature inside the storage area decreases. At point 302, after a first period of time 303 has passed, during which the vehicle is stationary, the mains power supply is disconnected from the refrigeration system. The vehicle can then be made mobile for a second period of time 304. During the second period of time 304, the temperature in the storage area continuously increases until it reaches ambient temperature (or the refrigeration system is connected to the mains again).

FIG. 3B is an example showing a plot of temperature against time in the storage area 101 of the vehicle 100 of FIG. 1 in accordance with an embodiment of the present disclosure. At point 311, the electrical system 106 receives electrical power from a mains power supply and supplies electrical power to the refrigeration system 103 to cool the eutectic plates 102. While the refrigeration system 103 is cooling the eutectic plates 102 during a first period of time 312, the temperature inside the storage area 101 decreases to the second temperature set-point 313 at point 314. The mains power supply is then disconnected from the refrigeration system 103 and the vehicle 100 can be made mobile for an ongoing second period of time 315. During the second period of time 315, the temperature inside the storage area 101 of the vehicle 100 initially increases, due to the ambient temperature outside of the vehicle being relatively high. The temperature inside the storage area 101 increases until point 316, at which the controller 108 determines that the temperature inside the storage area 101 is at the first temperature set-point 317. At point 316, the hydraulically driven generator 107 starts supplying electrical power to the refrigeration system 103 to cool the eutectic plates 102. The hydraulically driven generator 107 continues to supply electrical power to the refrigeration system 103 to cool the eutectic plates 102 and the temperature inside the storage area 101 of the vehicle 100 decreases over a period of time 318 until reaching the second temperature set-point 313 at point 319. At point 319, the hydraulically driven generator 107 stops supplying electrical power to the refrigeration system 103 and the temperature inside the storage area 101 of the vehicle 100 then increases until (again) reaching the first temperature set-point 317 at point 320. At point 320, the hydraulically driven generator 107 again starts supplying electrical power to the refrigeration system 103 to cool the eutectic plates 102 and the temperature inside the storage area 101 of the vehicle 100 decreases over a period of time 321 until reaching the second temperature set-point 313 at point 322. At point 322, the hydraulically driven generator 107 stops supplying electrical power to the refrigeration system 103 and the temperature inside the storage area 101 of the vehicle 100 increases. At point 323, for example, it may be determined that the storage area is no longer required to be cooled (for example, because goods to be transported for delivery that were required to be cooled have all been delivered). The temperature inside the storage area 101 of the vehicle 100 is therefore allowed to continue to rise to the ambient temperature by deactivating the refrigeration system.

Although in the example illustrated in FIG. 3B, the mains power supply is disconnected from the refrigeration system 103 upon the temperature inside the storage area 101 of the vehicle 100 reaching the second temperature set-point, it will be appreciated that the temperature inside the storage area 101 of the vehicle 100 may decrease to below the second temperature set-point 313 prior to the mains power supply being disconnected from the refrigeration system 103 and/or the storage area 101 may be maintained at a temperature for a period of time prior to the mains power supply being disconnected from the refrigeration system 103. Additionally or alternatively, the electrical power system 106 may be configured to control the supply of electrical power to the refrigeration system based on one or more temperature set-points.

Unlike in FIG. 3A, in FIG. 3B the temperature inside the storage area 101 of the vehicle 100 is maintained between the first temperature set-point and the second temperature set-point. This can be achieved by the hydraulically driven generator 107 supplying electrical power to the refrigeration system 103 during the periods of time 318 and 321. However, the hydraulically driven generator 107 is not required to supply electrical power to the refrigeration system 103 for the entirety of the second period of time 315 (i.e. when disconnected from the mains power). Furthermore, the temperature inside the storage area 101 of the vehicle 100 at point 324 in FIG. 3B is lower than the temperature at point 305 in FIG. 3A, i.e. after the same duration. Therefore, if electrical power is again supplied from a mains power supply to power the refrigeration system 103 after point 324, less power and/or time may be required to cool the eutectic plates 102 in order to reduce the temperature inside the storage area 101 of the vehicle 100 to the second temperature set-point 313 than if the temperature at point 324 was that at point 305.

Furthermore, to maintain a storage area 101 of a vehicle 100 at or below a particular temperature for a particular period of time using a process and/or system in accordance with FIG. 3A, it may be required to cool the eutectic plates 102 to a lower initial temperature prior to disconnecting the mains power supply compared to using a process and/or system in accordance with FIG. 3B. Therefore, compared to a system and/or process in accordance with FIG. 3A, a system and/or process in accordance with FIG. 3B may reduce the range of temperatures at which the refrigeration system 103 is required to be capable of cooling the eutectic plates 102 to, may reduce the time and/or power required to cool the eutectic plates 102 prior to the mains power supply being disconnected from the system and may allow the system to maintain a storage area 101 of a vehicle 100 within a narrower or more controllable range of temperatures. The embodiments also enable fewer or smaller eutectic plates to be used in to maintain a desired temperature over a given time period, since the plates can be re-cooled whilst the vehicle is being driven.

Although in the present disclosure the system described herein has been described as comprising the hydraulic pump 113, and the generator 107 has been described as being hydraulically driven, this is not essential and it is contemplated that the generator 107 may, less preferably, not be hydraulically driven and the system described herein may, less preferably, not comprise the hydraulic pump 113. The electrical system 106 is also not essential and, less preferably, the system described herein may not comprise the electrical system 106.

Although in the present disclosure the system described herein has been described as comprising one or more eutectic plates 102, one or more cooling blocks may be provided in place of the one or more eutectic plates 102.

Although the present disclosure has been described with reference to various embodiments, it will be understood by those skilled in the art that various changes in form and detail may be made without departing from the scope of the invention as defined by the accompanying claims.

What is claimed is:

1. A system for cooling a storage area of a vehicle, comprising:
   one or more eutectic plates for cooling the storage area;
   a refrigeration system configured to cool the one or more eutectic plates;
   an electrical system configured to receive electrical power from a mains power supply and supply electrical power to the refrigeration system;
   a variable displacement hydraulic pump having an input shaft for being driven by an engine of the vehicle; and
   a generator configured to receive hydraulic fluid from the hydraulic pump, generate electrical power in response thereto and supply the electrical power to the refrigeration system;
   wherein the hydraulic pump is configured to reduce the volume of hydraulic fluid that it supplies to the generator for each rotation of the input shaft, as the rotational speed of the input shaft increases.

2. The system of claim 1, wherein the hydraulic pump is configured to vary the volume of hydraulic fluid that it supplies to the generator for each rotation of the input shaft with an inversely proportional relationship to the rotational speed of the input shaft.

3. The system of claim 1, wherein the generator is configured to supply electrical power to the refrigeration system at substantially the same voltage and/or frequency as that which is supplied to the refrigeration system when said electrical system is connected to the mains power supply.

4. The system of claim 1, wherein the hydraulic pump comprises a piston configured to displace hydraulic fluid in a hydraulic fluid conduit when the input shaft is rotated, and is configured to vary an amount of displacement of hydraulic fluid in the hydraulic fluid conduit per revolution of the input shaft by varying an amount of displacement of the piston per revolution of the input shaft.

5. The system of claim 1, wherein the refrigeration system is configured to cool the one or more eutectic plates by circulating a refrigerant through a conduit in the one or more eutectic plates and/or a conduit in contact with an outside surface of the one or more eutectic plates.

6. The system of claim 1, comprising one or more temperature sensors for sensing a temperature of the one or more eutectic plates and/or a temperature of a storage area of a vehicle.

7. The system of claim 6, comprising a controller configured to control whether electrical power is supplied from the generator to the refrigeration system so as to cool the one or more eutectic plates based on a comparison of a temperature sensed by the one or more temperature sensors with one or more temperature set-points,
   wherein the refrigeration system is configured to cool the one or more eutectic plates by circulating a refrigerant through a conduit in the one or more eutectic plates and/or a conduit in contact with an outside surface of the one or more eutectic plates.

8. The system of claim 7, wherein the controller is configured to control whether the generator receives hydraulic fluid from the hydraulic pump based on the comparison of a temperature sensed by the one or more temperature sensors with the one or more temperature set-points.

9. The system of claim 1, configured such that when the generator is not generating electrical power, the input shaft is allowed to rotate without causing displacement of hydraulic fluid in the hydraulic pump.

10. A vehicle comprising:
   the system of claim 1;
   said storage area; and
   an engine for moving said vehicle;
   wherein the engine is mechanically coupled to said input shaft of the hydraulic pump.

11. A method of cooling the storage area of the vehicle of claim 10, the method comprising:
   (i) when the vehicle is stationary: connecting a mains power supply to the electrical system, and supplying electrical power from the mains power supply to the refrigeration system so as to cool the one or more eutectic plates; and
   (ii) when the vehicle is mobile: using the engine of the vehicle to rotate the input shaft; supplying hydraulic fluid from the hydraulic pump to the generator, the generator generating electrical power in response thereto and supplying the electrical power to the refrigeration system so as to cool the one or more eutectic plates; wherein the hydraulic pump reduces the volume of hydraulic fluid that it supplies to the generator for each rotation of the input shaft, as the rotational speed of the input shaft increases.

12. The method of claim 11, comprising reducing the volume of hydraulic fluid that the hydraulic pump supplies to the generator in response to the rotational speed of the input shaft increasing.

13. A method of providing a vehicle by installing the system of any of claim 1 in the vehicle, the method comprising:
providing said storage area with the one or more eutectic plates;
providing the vehicle with the generator, the hydraulic pump, the refrigeration system and the electrical system;
mechanically coupling said engine to the input shaft;
fluidly coupling the hydraulic pump to the generator; and
electrically coupling the generator to the refrigeration system.

14. A system for cooling a storage area of a vehicle, comprising:
one or more cooling blocks for cooling the storage area;
a refrigeration system configured to cool the one or more cooling blocks;
an electrical system configured to receive electrical power from a mains power supply and supply electrical power to the refrigeration system;
a variable displacement hydraulic pump having an input shaft for being driven by an engine of the vehicle; and
a generator configured to receive hydraulic fluid from the hydraulic pump, generate electrical power in response thereto and supply the electrical power to the refrigeration system;
wherein the hydraulic pump is configured to reduce the volume of hydraulic fluid that it supplies to the generator for each rotation of the input shaft, as the rotational speed of the input shaft increases.

15. The system of claim 14, wherein the refrigeration system is configured to cool the one or more cooling blocks by circulating a refrigerant through a conduit in the one or more cooling blocks and/or a conduit in contact with an outside surface of the one or more cooling blocks.

* * * * *